US006501810B1

(12) United States Patent

Karim et al.

(10) Patent No.: US 6,501,810 B1
(45) Date of Patent: Dec. 31, 2002

(54) FAST FRAME SYNCHRONIZATION

(75) Inventors: Mohammad Rez Karim, Monmouth County, NJ (US); Robert Louis Cupo, Monmouth County, NJ (US); Mohsen Sarraf, Monmouth County, NJ (US); Mohammad Zarrabizadeh, Middlesex County, NJ (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/170,174

(22) Filed: Oct. 13, 1998

(51) Int. Cl.[7] .............................. H04L 7/00; H04L 7/08

(52) U.S. Cl. ........................................ 375/369; 375/354

(58) Field of Search ................................ 375/354, 295, 375/316, 369, 364, 365, 360, 377, 327, 376; 370/503, 509, 252, 253, 504, 505, 506, 510, 512, 514, 518, 520, 304, 305, 522

(56) References Cited

U.S. PATENT DOCUMENTS 5,491,531 A * 2/1996 Adams et al. .............. 375/354
5,818,547 A * 10/1998 Ozaki ...................... 348/845.3
5,854,794 A * 12/1998 Pawlowski .................. 370/509
5,995,519 A * 11/1999 Miwa ......................... 370/509
6,047,004 A * 4/2000 Koyoama ................... 370/509
6,208,695 B1 * 3/2001 Klank et al. ................ 375/260
6,263,033 B1 * 7/2001 Hansen ........................ 375/370
6,272,194 B1 * 8/2001 Sakamoto ................... 375/368
6,339,627 B1 * 1/2002 Ashizawa ................... 375/365
6,339,628 B1 * 1/2002 Yoshida ...................... 375/376

* cited by examiner

*Primary Examiner*—Don N. Vo
*Assistant Examiner*—Dung X. Nguyen
(74) *Attorney, Agent, or Firm*—Istrate Ionescu

(57) ABSTRACT

A receiver for receiving synchronized digital transmissions organized in frames, each frame having a frame start, has a clock for generating pulses at time intervals with respect to a time reference and a counter for generating a count of the time intervals with respect to the time reference. A/D converters sample the digital transmission using the pulses from the clock. A cyclic prefix correlator detects the frame start during a count corresponding to an A/D sample. This count is indicative of the time interval during which the frame start was detected with respect to the reference. A memory is provided for storing a plurality (typically 36) counts indicative of the time interval during which the frame start was detected. A pointer is generated from the counts stored in memory. The pointer is indicative of a projected time interval during which a future frame start is expected to arrive. This projected time interval is computed by using a lead/lag digital filter and an oscillator responsive to the digital filter. One or more portions of the receiver are implemented using a programmable signal processor.

18 Claims, 5 Drawing Sheets

FAST FRAME SYNCHRONIZATION

FIELD OF THE INVENTION

This invention is in the field of detection of, and synchronization to, digital signals organized in a sequence of frames transmitted in a medium subject to fading and other changes in propagation characteristics and influences due to receiver and/or transmitter clock frequency drift.

BACKGROUND OF THE INVENTION

In certain radio broadcast applications, made up of audio signals such as news or music, the content of a radio broadcast is simultaneously distributed to a plurality of locations. In general, such broadcasting can be performed using digital signals embedded in an analog carrier. When using digital signals, the news or music to be transmitted is first digitized with well known analog to digital converters into a series of digital pulses descriptive of the analog signals. Subsequently, the digital pulses are organized into groupings for subsequent transmission. Such a grouping of digital pulses containing digitized news or music make up a frame. Each frame contains digital signals corresponding to an audio signal as well as other digital signals related to the identification of the frame itself and its start, error correction and other functions. Examples of transmission methods using frames for digital audio broadcasting are well known in the art. Examples of digital broadcasting systems are described by R. L. Cupo, M. Sarraf, M. Sharriat and M. Zarrabizadeh in *An OFMD All Digital In Band On Channel* (IBOC) *AM and FM Radio Solution Using the PAC* encoder, IEEE Transactions on Broadcasting, Vol 44, No 1, March 1998, pp 22–27; B. W. Kroeger and A. J. Vigil, in Improved *IBOC DAB technology for AM and FM Broadcasting,* 1996 NAB SBE Conference, Los Angeles, Calif. November 1996; B. W. Kroeger and P. J. Peyla, in *Compatibility of FM Hybrid In Band On Channel* (IBOC) *System Digital Audio Broadcasting*, IEEE Transactions on Broadcasting, Vol 43, No 4, December 1997, pp 421–429. Descriptions of OFDM systems are made by W. Y. Zou and Y. Wu in COFDM-An overview, IEEE Transactions on Broadcasting, Vol 41, No 1, March 1995, pp 1–8; J. A. C. Bingham, *Multicarrier Modulation for Data Transmission: An Idea Whose Time Has Come*, IEEE Comm. Mag., May 1990, pp 5–14; as well as J. A. C. Bingham, *The Theory and Practice of Modem Design*, John Wiley Publishers, New York, 1988, pp 108–121.

Another example of a frame organized, digital transmission system for audio transmission is related to telephone packet switching and is described in the 1990 CCITT interim recommendations on ISDN number I.432, titled *B-ISDN User Network Interface Physical Layer* Specification and related documents.

In above examples, a string of frame organized digital signals are transmitted over a changing medium, such as air, using a frequency or amplitude modulated carrier. These digital signals are subject to distortion and interference from various probabilistic phenomena such as, for example, Rayleigh fading, attenuation due to precipitation, multipath transmission and others as detailed by K. Bullington in *Radio Propagation Fundamentals*, Bell System Technical Journal, vol 36, no 3, pp 593–626.

Another interfering phenomenon is clock drift or instability in both the receiver and the transmitter. Small clock frequency shifts, or drift, contribute to phase instability of the carrier emanating from the transmitter, and the corresponding clock mechanism at the receiver, thus adding to the interference induced by external phenomena listed above.

One effect of these probabilistic phenomena is to distort the transmitted digital signal or disable the synchronization mechanism at the receiver thus rendering the frame structure corrupt. This frame corruption presents a problem to the receiver of the frame. If the digital structure of the frame cannot be extracted because of its time distorted content, or phase shift, the receiver cannot correctly extract the digital message within the frame. When the start of a frame cannot be identified, the information contained in the frame is lost, resulting in an undesirable loss of data.

Various methods are known in the art to reduce the impact of data loss related to transmission problems. One approach is to induce retransmission of lost frames, such as described, for example, in open systems interconnection specification X.25 and its progeny. This retransmission of lost frames avoids data loss by redundant retransmission. However, retransmission increases transmission time. To contrast, in music and news broadcast applications, data retransmission is not practical and data loss is characterized by discontinuities in the audio signal, perceived as a decrease in sound quality or permanent data loss. Thus, it is desirable to reduce the occurrence of lost frames so as to increase transmission efficiency in telephone networks and increase audio quality in broadcast systems.

SUMMARY OF INVENTION

Above problems of frame synchronization are avoided in accordance with the present invention by providing a synchronizing receiver for receiving a digital transmission, the digital transmission composed of a sequence of consecutive bits. The sequence of consecutive bits form a plurality of frames, each of the frames having a frame start. The receiver has a clock for generating pulses at time intervals with respect to a time reference and a counter for counting the time intervals with respect to the time reference thus generating for each of the pulses a count of the time intervals with respect to the time reference. Sampling means, such as A/D converters, for sampling the digital transmission, use the pulses from the clock to extract the digital transmission. A cyclic prefix correlator detects the frame start within the sequence of consecutive bits during a count generated by the counter. This count is indicative of the time interval during which the frame start was detected with respect to the reference. A memory is provided for storing a plurality (typically 36) of counts indicative of the time interval during which the frame start was detected.

A pointer is generated from the counts stored in memory. The pointer is indicative of a projected time interval during which a future frame start is expected to arrive. This projected time interval is computed by using a digital filter. An oscillator responsive to the digital filter generates the pointer.

The digital filter is of the form $y_n=k_0x_n+k_1x_{n-1}+k_2y_{n-1}$, n=0, 1, 2 . . . 35 where n references the frame, $y_n$ is the pointer, $y_{n-1}$, is a previous pointer, $x_n$ is the count, $x_{n-1}$, is a previous count, and $k_0=0.003253878916$, $k_1=-0.002986$, and $k_2=0.9997325877$. A means for adjusting a threshold in response to the absolute value of the difference between said count and said pointer is also provided.

One or more portions of the receiver are implemented using a programmable signal processor.

BRIEF DESCRIPTION OF THE DRAWING

These and other features of the invention will become apparent from the following description and claims, when taken with the accompanying drawings, wherein similar reference characters refer to similar elements throughout, and in which:

DETAILED DESCRIPTION

Figure 1:
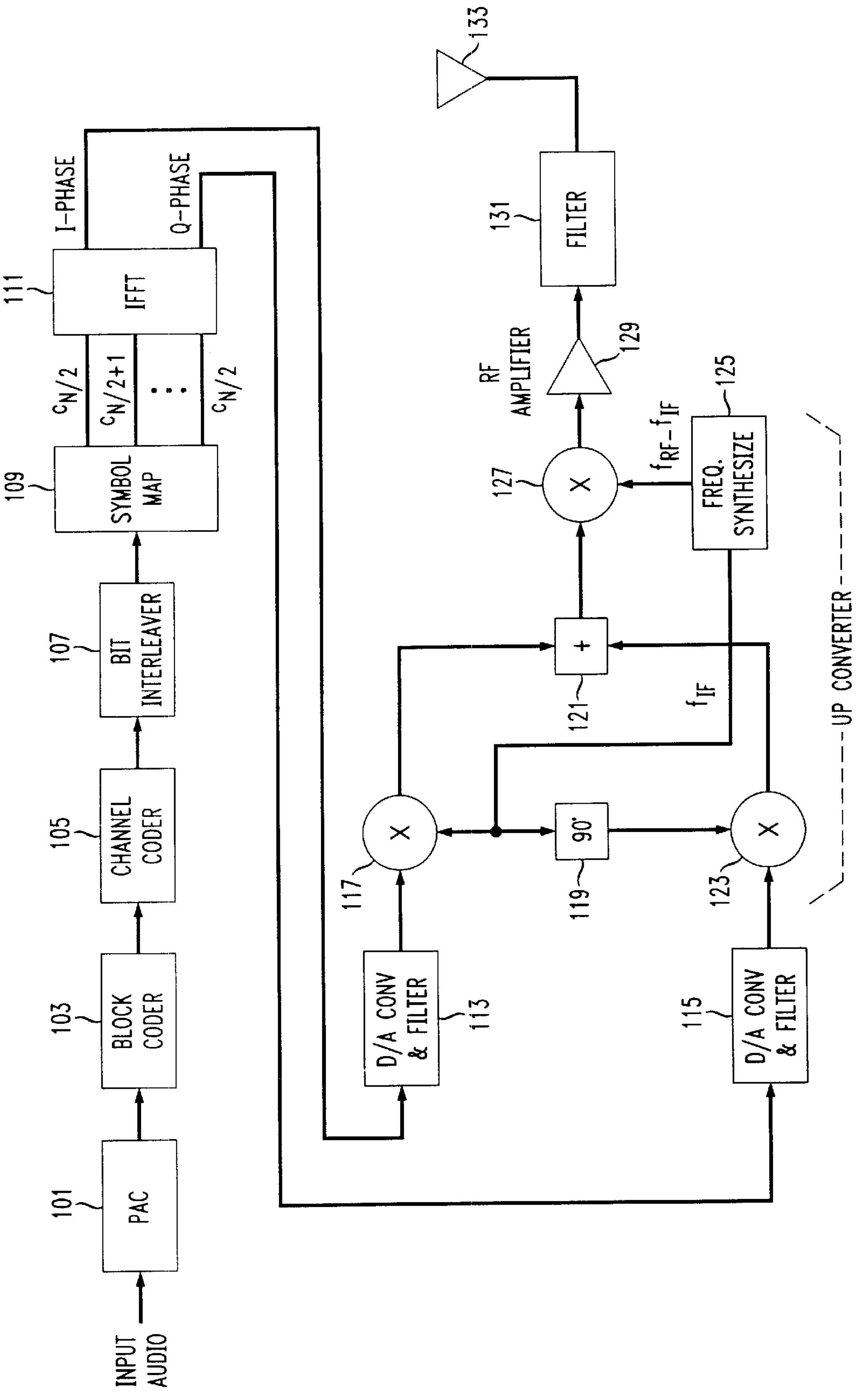
FIG. 1 PRIOR ART
FIG. 1 is an exemplary transmitter well known in the art.

Shown in FIG. 1 (prior art), is a typical transmitter for generating a radio signal having digital content generally applicable to this invention. A digital signal modulates a radio frequency carrier launched via an antenna to a receiver, using, for example, a signal convention called Orthogonal Frequency Division Multiplexing (OFDM). In the illustrative transmitter of FIG. 1, an audio signal is converted to digital format in PAC 101, then encoded in block encoder 103, and channel coder 105. To mitigate the effects of clustered errors such as those caused by Rayleigh fades, the data bits of the output of channel coder 105 are re-ordered in interleaver 107. Symbol map 109 is a base-band differential encoder where the binary output of bit interleaver 107 is converted, by means of a serial to parallel converter, into two streams and mapped into in-phase and quadrature symbols. These symbols, in turn, modulate a number of sub-carrier frequencies, part of the OFDM system. Thus, the output of symbol map 109 is in the frequency domain. IFFT engine 111 converts the frequency domain information into time domain signals. IFFT engine 111 adds a cyclic prefix during the guard period of the transmitted signal.

Each I and Q component is converted by digital to analog converter 115 and 113 respectively. The analog signal thus created is passed through baseband filters and then used to modulate an intermediate frequency carrier. IF frequency synthesizer 125 supplies IF energy to a modulator. The modulator is made up of blocks 117, 119, 121 and 123. The resulting signals from 117 and 123 are summed in summer 121 and modulated along with radio frequency carrier from frequency synthesizer 125, amplified in RF amplifier 129 filtered in filter 131 and launched from antenna 133 for transmission. In effect, the output of the modulator is up-converted into an RF signal in block 127, amplified in RF amplifier 129, filtered in filter 131, and transmitted over antenna 133. Thus the output from antenna 133 is a series of digital pulses modulating a radio frequency (OFDM) carrier. In a typical example, the transmission from antenna 133 has a guard period 76 microseconds long and a symbol period 1.214 milliseconds long.

Figure 2:
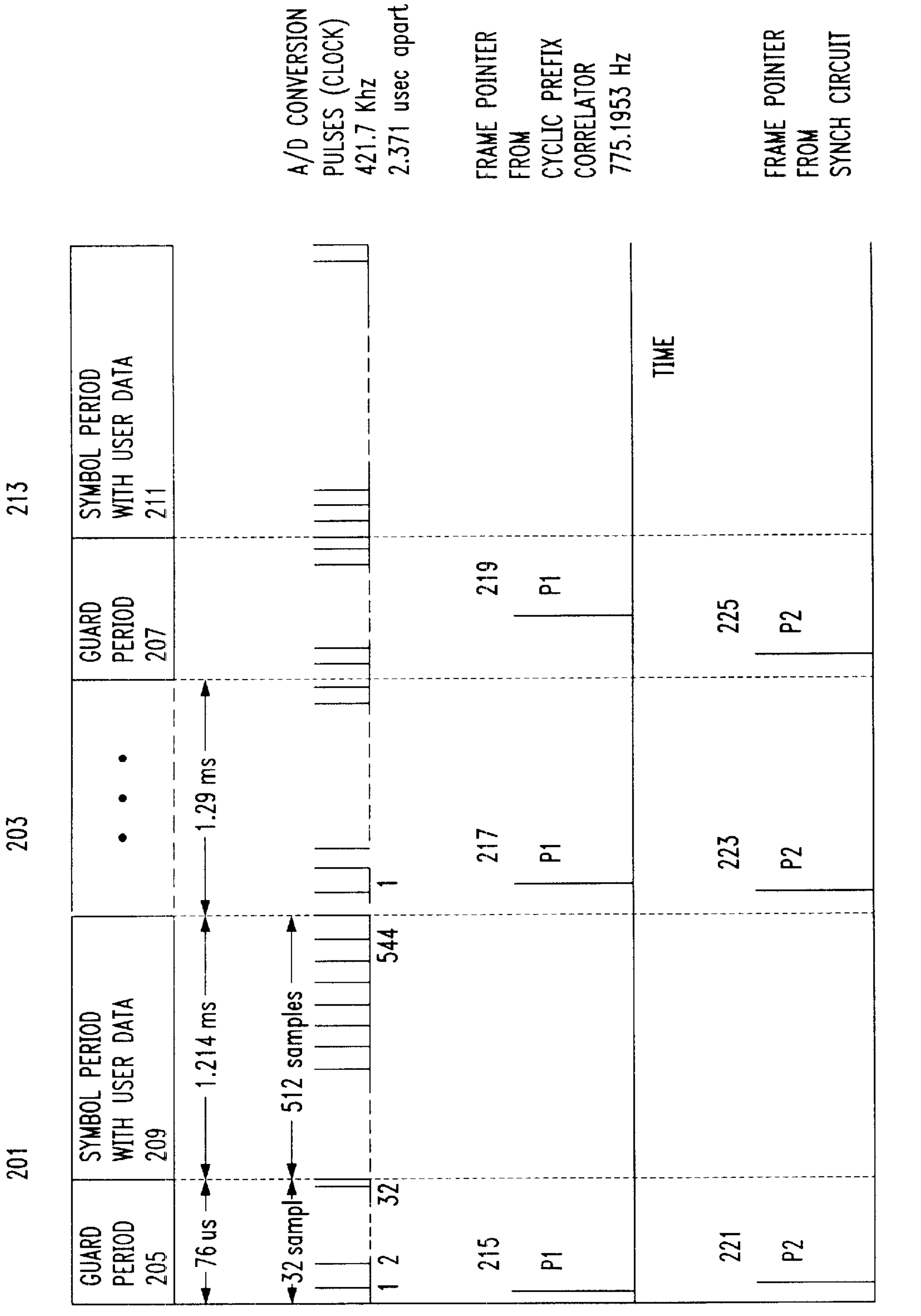
FIG. 2 is the relative timing of various clock and frame pointers of present invention as applicable to a specific example.

FIG. 2 shows an exemplary timeline of various signals within the synchronizing receiver of the present invention. As an example, a received OFDM transmission comprises a number of consecutive, typical frames 201, 203, and 213. The structures of frames 201, 203 and 213 are similar. The structure of frame 201 has a guard period 205 and a symbol period 209. Similarly, frame 213 has a guard period 207 and a symbol period 211. Frame 203 has the same structure, but the guard period and symbol period are not shown.

In this typical example, the guard period, such as 205 and 207, is 76 microsecond long and is sampled within the receiver by 32 A/D converter conversions initiated by clock pulses, numbered 1 to 32. Clock pulses are generated by a clock within the receiver, with respect to a time reference, as is well known in the art. The symbol period, containing user data, such as 209 and 211, is 1.214 millisecond long and is also sampled using the A/D converter, yielding 512 samples. The A/D conversion rate is 421.7 Khz. Typically, for this example, the receiver operates in the FM band, at a carrier frequency between 88.1 and 107.9 Mhz, with a bandwidth of 135.0778 Khz. The data rate is typically 248 Kbps.

As shown in FIG. 2, upon receiving a signal from the transmitter, the cyclic prefix correlator indicates the position of P1 start of a frame 215 at the first A/D conversion time (or count) within guard period 205. Thus P1 is pointed to by count 1 of the A/D converter within the 32 available conversion times within guard period 205. Because of various probabilistic effects as discussed above, P1 start of frame 217 for frame 203 is detected near the second A/D conversion time (count=2) while for frame 213 P1 start of frame 219 has moved further beyond count=3. This example shows the general tendency for P1 to shift with time, that is, the frame pointer P1 designating the detected digital sample location of the frame start with respect to the A/D converter clock reference, as indicated by the cyclic prefix correlator, will vary from frame to frame. It is this variation in the count associated with P1 timing from one frame to another that is reduced by the means devised in this invention. Frame pointer P2 from the synchronization circuit of this invention such as 221, 223 and 225, is shown to be within a narrower A/D, or clock count as compared to P1.

Figure 3:
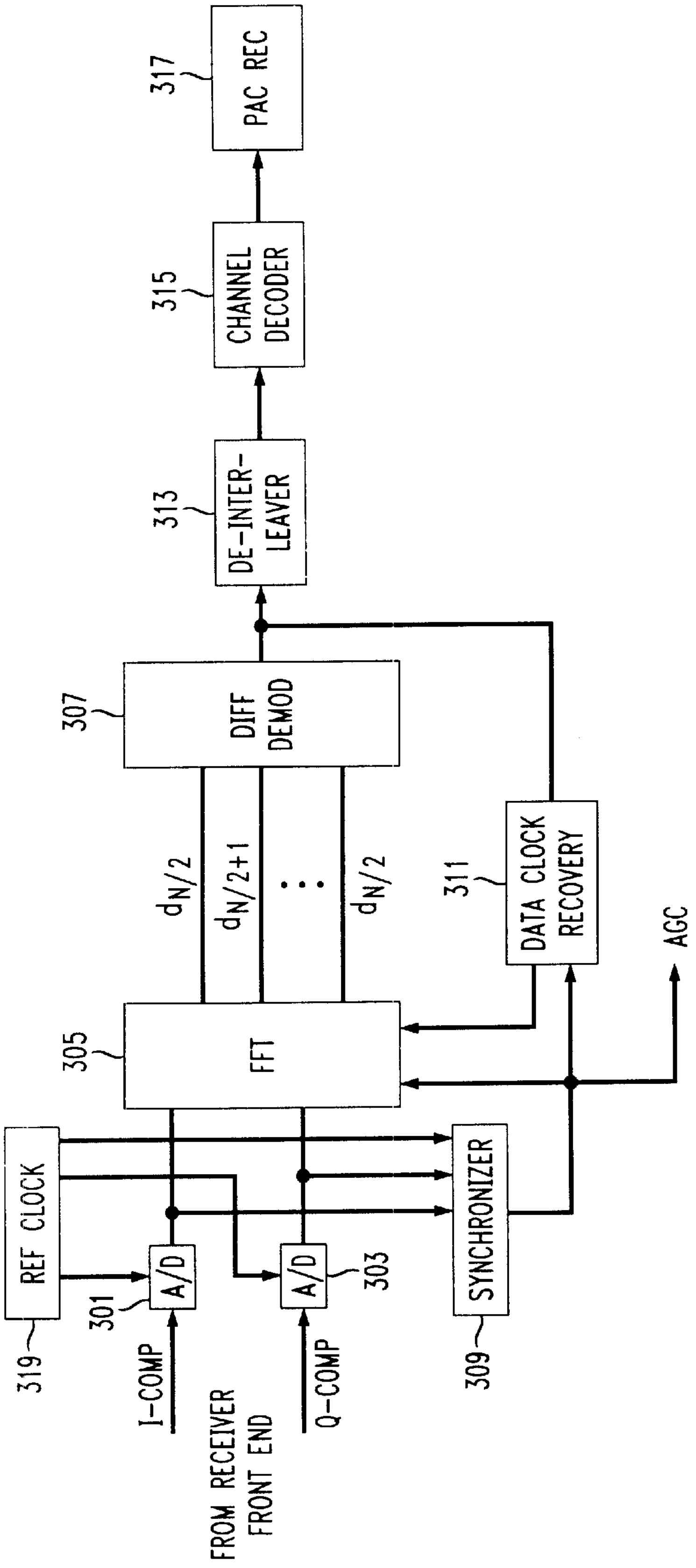
FIG. 3 is an exemplary receiver of the present invention.

FIG. 3 shows an exemplary receiver of the present invention. Analog to digital converters 301 and 303 sample the analog In phase and Quadrature component respectively and convert it to a sequence of digital samples in accordance with input from clock 319. The conversion in Fast Fourier Transform engine (FFT) 305 extracts the frequency components of the received signal and sends them to differential demodulator 307. Synchronizer 309 detects the incoming pulses from the A/D converters 301 and 302 and sends a pointer to the data clock recovery unit 311 indicative of the position of a frame start pulse with respect to reference clock 319 as explained with respect to FIG. 2 above. Once the pointer to the frame start pulse has been reported by synchronizer 309, de-interleaver 313 in conjunction with channel decoder 315 and PAC receiver 317 extracts data contained in the incoming frame. In the best mode implementation known to the inventors at this time, the sample rate for the A/D converters is 421.7 Khz.

Figure 4:
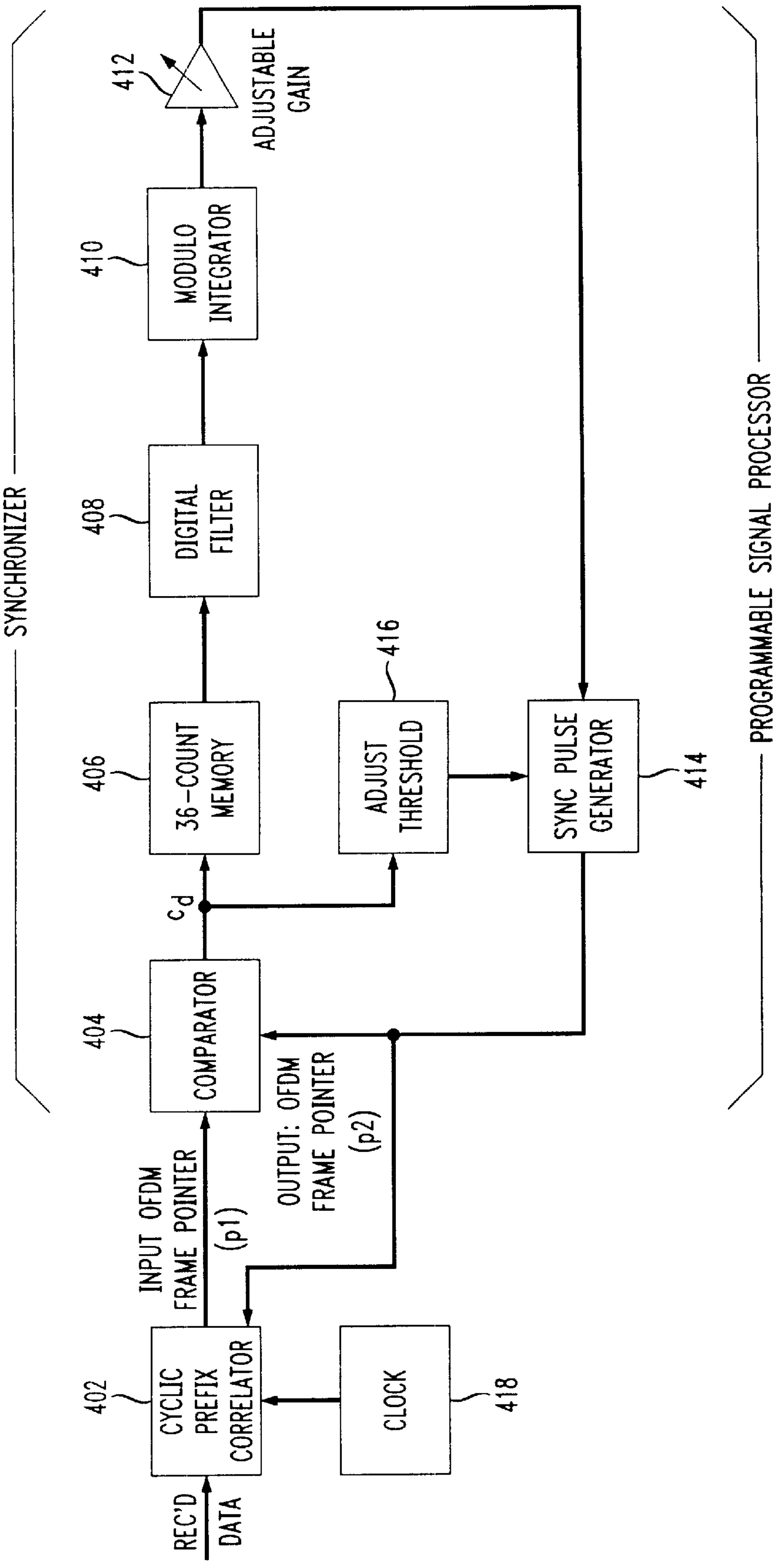
FIG. 4 is a synchronization circuit of the present invention to be used in conjunction with the exemplary receiver of FIG. 3 exemplarily implemented as a programmable signal processor.

FIG. 4 further details the structure of the synchronizer 309 in FIG. 3. In FIG. 4, a cyclic prefix correlator 402 examines the stream of digital samples forming the digital transmission arriving from the A/D converters in the receiver. The digital transmission is composed of a sequence of consecutive bits. The sequence of consecutive bits form a plurality of frames. Each frame has a frame start. The samples are obtained, for example, from A/D converters 301 and 303. The cyclic prefix correlator identifies among these samples the one corresponding to the start of a frame P1. Thus, the output from correlator 402 is a pointer P1 identifying the count, or time, of the A/D sample corresponding to the start of frame as shown in FIG. 2.

In FIG. 4, a clock 418 generates pulses at time intervals with respect to a time reference. A counter for counting the time intervals with respect to the time reference is provided within clock 418. The counter generates for each of the pulses a count of the time intervals with respect to the time reference. The A/D converters use the clock pulses from clock 418 to extract the sequence of consecutive bits contained within the digital transmission. The cyclic prefix correlator 402 detects the time position of the frame start within the sequence of consecutive bits from the A/D converters. Clock 418 supplies a count indicative of the time interval during which the frame start is detected by cyclic prefix correlator 402.

The count output by cyclic prefix correlator 402 is stored in memory 406, after being compared by comparator 404 to the "predicted" value. Memory 406 stores 36 counts indicative of the time interval during which the frame start was detected.

From these 36 values, a pointer P2 indicative of a projected time interval during which a future frame start is expected to arrive is computed. Pointer P2 corresponds to the count, or time interval, during which the "next" frame start will arrive. Examples of P2 are identified as pointers 221, 223 and 225 in FIG. 2.

The computation of projected arrival time for P2 is done by digital filter 408. Comparator 404 compares the time position P1 with the time position P2 of the frame start. 36 differences computed from P1–P2 are stored memory 406 for the last 36 frames. Digital filter 408 uses the 36 entries in memory 406 to smooth variable arrival time of P1 and predict the next time position of P2. One example of the lead/lag digital filter used has these coefficients:

$$k_0=0.003253878916$$

$$k_1=-0.002986$$

$$k_2=0.9997325877$$

and is of the form where the output $y_n$, of the filter is given by $$y_{n=k0}x_n+k_1x_{n-1}k_2y_{n-1}\ldots,\ n=0,1,2\ldots 35$$

where n references a particular frame, $y_n$ is the "future" pointer, $y_{n-1}$, is a previous future pointer, $x_n$ is pulse count output by the cyclic prefix correlator, $x_{n-1}$ is a previous count, as the mathematical notation shows. The output from digital filter 408 is integrated in modulo integrator 410, where the integral value of the integrator output is kept and the remainder is discarded. Adjustable gain amplifier 412 matches the output of the modulo integrator to voltage to frequency converter transfer characteristics of synchronizing pulse generator 414. Pulse generator 414 increases or decreases its output pulse frequency according to voltages from amplifier 412.

Threshold adjustment 416 responds to the difference between P1 and P2. If the difference is low, the threshold is set high, to 25 times base voltage V. If absolute value of P1–P2 is large, the threshold is set low.

Figure 5:
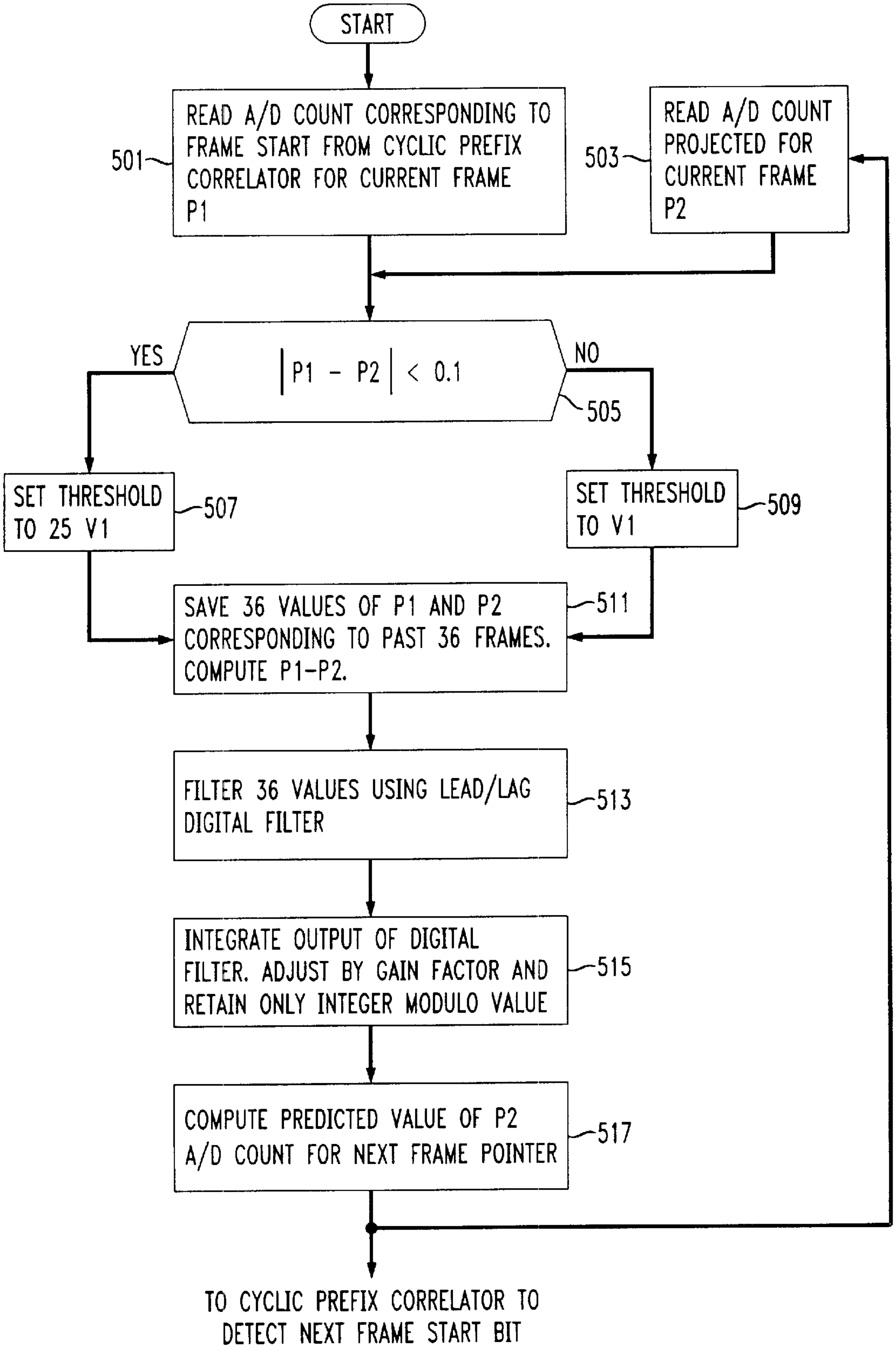
FIG. 5 is a flow diagram of the synchronization circuit of the present invention.

FIG. 5 is the flow diagram used by the apparatus of this invention, typically implemented in a programmable signal processor (PSP). In step 501, P1 is read from the A/D conversion, as indicated by the pulse count. The pulse count identifying the position of the frame start is detected by the Cyclic Prefix Correlator. P2, the projected value of time of arrival for the frame start is read in step 503. P1 and P2 are compared in decision box 505. If the absolute value of P1–P2 is less than 0.1, then the signal detection threshold in the cyclic prefix generator is set high, to about 25 V1. Conversely, if P1–P2 is greater than 0.1 (high), indicating that the predicted time of arrival of the next frame start is significantly different from the current time of arrival, the threshold is set to its minimum value V1.

As described above, when the absolute value of P1–P2 is less than 0.1, that is P2 approaches P1, the control loop has adapted to the incoming time synchronization indicated by P1. At this time, the signal detection threshold is set high. With a high threshold, minor or transient variations in P1–P2 will be essentially ignored and P2 will come to a steady state quickly. P2 will vary within a narrow range without affecting the input from P1.

Conversely, when the absolute value of P1–P2 is high indicating a substantial change in arrival time, the threshold is set low so that P2 is sensitive to P1. Now P2 can respond to and track P1 relatively quickly. Note that if P1 has significantly changed from its previous steady state value, and if this change persists for a period of time (less than 36 frames), the output of digital filter 408 and modulo integrator 410 will continually increase because the values of P1–P2 are saved in memory 406, and integrated causing P2 to change in large steps in an attempt to track P1. This tracking action is complete even though the threshold is set to "low", i.e. V1. Thus P2 will approach P1. Once P2 is close to P1, as indicated by P1–P2 less than 0.1, the threshold is set to "high", i.e. 25 V1. P2 may overshoot P1 momentarily, but if the threshold is still high, P2 will rapidly come to a steady state near P1.

In block 511, 36 values of P1 and P2 are stored for the past 36 frames in receiver memory. P1–P2 is computed. These 36 values are used in block 513 by digital filter 408 as described above, using a lead/lag filter. In block 515 the output of the digital filter is integrated over the past 36 values, as outlined for modulo integrator 410, and the value adjusted by a gain to accommodate subsequent stages. Finally, in block 517, the integer modulo value from block 515 is converted to a projected arrival time for the next frame start. One possible implementation of block 517 is a voltage to frequency converter where the value of the modulo integrator is converted to a frequency indicative of the projected frame start arrival time.

The inventors have found that one or more portions of the receiver of this invention, as for example, the digital filter, and the threshold detector, can be implemented using a programmable signal processor.

Although presented in exemplary fashion employing specific embodiments, the disclosed structures are not intended to be so limited. For example, the signal synchronization concepts described herein are not limited to FM transmissions or telephony applications but can also be applied to satellite communications and any other means using frame oriented digital communication. Those skilled in the art will also appreciate that numerous changes and modifications could be made to the embodiment described herein without departing in any way from the invention. As another example, the frequency output by synch pulse generator 414 can be applied directly as clock 418 to achieve synchronization to the incoming frame start. These changes and modifications and all obvious variations of the disclosed embodiment are intended to be embraced by the claims to the limits set by law.

We claim:

1. A receiver for receiving a digital transmission, said digital transmission composed of a sequence of consecutive bits, said sequence of consecutive bits forming a plurality of frames, each of said frames having a frame start, said receiver comprising:

a clock for generating pulses at time intervals with respect to a time reference;

a counter for counting said time intervals with respect to said time reference thus generating a count for said frame start, said count indicative of time of detection of said frame start with respect to said time reference;

a synchronizer that generates a pointer, said pointer generated from a plurality of said counts, said pointer indicative of a projected time interval during which a future frame start is expected to arrive, wherein said digital transmission is sampled to extract said sequence of consecutive bits using said pulses from said clock and wherein said count indicative of time of detection of said frame start is initiated by a cyclic prefix correlator.

2. A receiver for receiving a digital transmission, said digital transmission composed of a sequence of consecutive bits, said sequence of consecutive bits forming a plurality of frames, each of said frames having a frame start, said receiver comprising:

a clock for generating pulses at time intervals with respect to a time reference;

a counter for counting said time intervals with respect to said time reference thus generating a count for said frame start, said count indicative of time of detection of said frame start with respect to said time reference;

a synchronizer that generates a pointer, said pointer generated from a plurality of said counts, said pointer indicative of a projected time interval during which a future frame start is expected to arrive, wherein said count and said pointer is stored within a memory, said memory stores 36 said counts, and wherein said synchronizer further comprises a digital filter and an oscillator responsive to said digital filter.

3. A receiver as claimed in claim 2, wherein said digital filter is of the form $y_n=k_0x_n+k_1x_{n-1}+k_2y_{n-1}$, n=0, 1, 2 . . . 35 where n references one said frame, $y_n$ is said pointer, $y_{n-1}$ is a previous pointer, $x_n$, is said count, $x_{n-1}$ is a previous count, and $k_0=0.003253878916$, $k_1=-0.002986$, and $k_2=0.9997325877$.

4. A receiver for receiving a digital transmission, said digital transmission composed of a sequence of consecutive bits, said sequence of consecutive bits forming a plurality of frames, each of said frames having a frame start, said receiver comprising:

a clock for generating pulses at time intervals with respect to a time reference;

a counter for counting said time intervals with respect to said time reference thus generating a count for said frame start, said count indicative of time of detection of said frame start with respect to said time reference;

a synchronizer that generates a pointer, said pointer generated from a plurality of said counts, said pointer indicative of a projected time interval during which a future frame start is expected to arrive, wherein said synchronizer further comprises a means for adjusting a threshold in response to the absolute value of the difference between said count and said pointer.

5. A receiver as claimed in claim 4, wherein said threshold is set low when the absolute value of the difference between said count and said pointer is high.

6. A receiver as claimed in claim 4, wherein said threshold is set high when the absolute value of the difference between said count and said pointer is low.

7. A method for synchronizing reception of a digital transmission, said digital transmission composed of a sequence of consecutive bits, said sequence of consecutive bits forming a plurality of frames, each of said frames having a frame start, comprising the steps of:

generating clock pulses at time intervals with respect to a time reference;

counting said time intervals with respect to said time reference thus generating a count for said frame start, said count indicative of time of detection of said frame start with respect to said time reference;

generating a pointer, said pointer generated from a plurality of said counts, said pointer indicative of a projected time interval during which a future frame start is expected to arrive, wherein said clock pulses are used to sample said digital transmission to extract said sequence of consecutive bits, and wherein said count indicative of detection of said frame start within said sequence of consecutive bits is initiated by a cyclic prefix correlator.

8. A method for synchronizing reception of a digital transmission, said digital transmission composed of a sequence of consecutive bits, said sequence of consecutive bits forming a plurality of frames, each of said frames having a frame start, comprising the steps of:

generating clock pulses at time intervals with respect to a time reference;

counting said time intervals with respect to said time reference thus generating a count for said frame start, said count indicative of time of detection of said frame start with respect to said time reference;

generating a pointer, said pointer generated from a plurality of said counts, said pointer indicative of a projected time interval during which a future frame start is expected to arrive, wherein said step of generating said pointer includes the step of storing said counts and one or more of said pointers in a memory, wherein said step of storing stores 36 said counts in a memory and wherein said step of generating said pointer further uses a digital filter and an oscillator to said digital filter.

9. A method as claimed in claim 8, wherein said step of generating said pointer uses a digital filter of the form $y_n=k_0x_n+k_1x_{n-1}+k_2y_{n-1}$, n=0, 1, 2 . . . 35 where n references one said frame, $y_n$ is said pointer, $y_{n-1}$, is a previous pointer, $x_n$, is said count, $x_{n-1}$ is a previous count, and $k_0=0.003253878916$, $k_1=-0.002986$, and $k_2=0.9997325877$.

10. A method for synchronizing reception of a digital transmission, said digital transmission composed of a sequence of consecutive bits, said sequence of consecutive bits forming a plurality of frames, each of said frames having a frame start, comprising the steps of:

generating clock pulses at time intervals with respect to a time reference;

counting said time intervals with respect to said time reference thus generating a count for said frame start, said count indicative of time of detection of said frame start with respect to said time reference;

generating a pointer, said pointer generated from a plurality of said counts, said pointer indicative of a projected time interval during which a future frame start is expected to arrive, wherein said step to detect said frame start within said sequence of consecutive bits further comprises a step for adjusting a threshold in response to the absolute value of the difference between said count and said pointer.

11. A method as claimed in claim 10, wherein said threshold is set low when the absolute value of the difference between said count said pointer is high.

12. A method as claimed in claim 10, wherein said threshold is set high when the absolute value of the difference between said count and said pointer is low.

13. A programmable signal processor programmed for synchronizing the reception of a digital transmission, said digital transmission composed of a sequence of consecutive bits, said sequence of consecutive bits forming a plurality of frames, each of said frames having a frame start said programmable processor performing the steps of:

counting time intervals with respect to a time reference thus generating a count for said frame start, said count indicative of time of detection of said frame start with respect to said time reference;

generating a pointer, said pointer generated from a plurality of said counts, said pointer indicative of a projected time interval during which a future frame start is expected to arrive, wherein said count indicative of time of detection of said frame start is initiated by a cyclic prefix correllator.

14. A programmable signal processor programmed for synchronizing the reception of a digital transmission, said digital transmission composed of a sequence of consecutive bits, said sequence of consecutive bits forming a plurality of frames, each of said frames having a frame start, said programmable processor performing the steps of:

counting time intervals with respect to a time reference thus generating a count for said frame start, said count indicative of time of detection of said frame start with respect to said time reference;

generating a pointer, said pointer generated from a plurality of said counts, said pointer indicative of a projected time interval during which a future frame start is expected to arrive, wherein said step for generating said pointer implements a digital filter.

15. A programmable signal processor as claimed in claim 14, wherein said digital filter is of the form $y_n=k_0x_n+k_1x_{n-1}+k_2y_{n-1}$, n=0, 1, 2 . . . 35 where n references one said frame, $y_n$ is said pointer, $y_{n-1}$ is a previous pointer, $x_n$ is said count, $x_{n-1}$ is a previous count, and $k_0=0.003253878916$, $k_1=-0.002986$, and $k_2=0.9997325877$.

16. A programmable signal processor programmed for synchronizing the reception of a digital transmission, said digital transmission composed of a sequence of consecutive bits, said sequence of consecutive bits forming a plurality of frames, each of said frames having a frame start, said programmable processor performing the steps of:

counting time intervals with respect to a time reference thus generating a count for said frame start, said count indicative of time of detection of said frame start with respect to said time reference;

generating a pointer, said pointer generated from a plurality of said counts, said pointer indicative of a projected time interval during which a future frame start is expected to arrive, wherein said step for generating a pointer adjusts a threshold in response to the absolute value of the difference between said count and said pointer.

17. A programmable signal processor as claimed in claim 16, wherein said threshold is set low when the absolute value of the difference between said count and said pointer is high.

18. A programmable signal processor as claimed in claim 16, wherein said threshold is set high when the absolute value of the difference between said count and said pointer is low.

* * * * *